Figure 1:
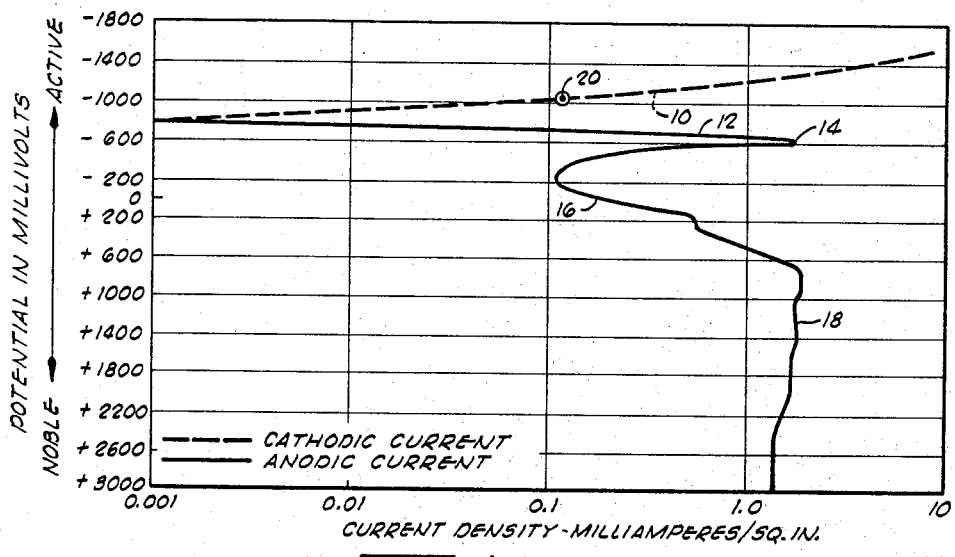

INVENTORS
WILLIAM P. BANKS &
JOHN D. SUDBURY
BY
William J. Miller
ATTORNEY

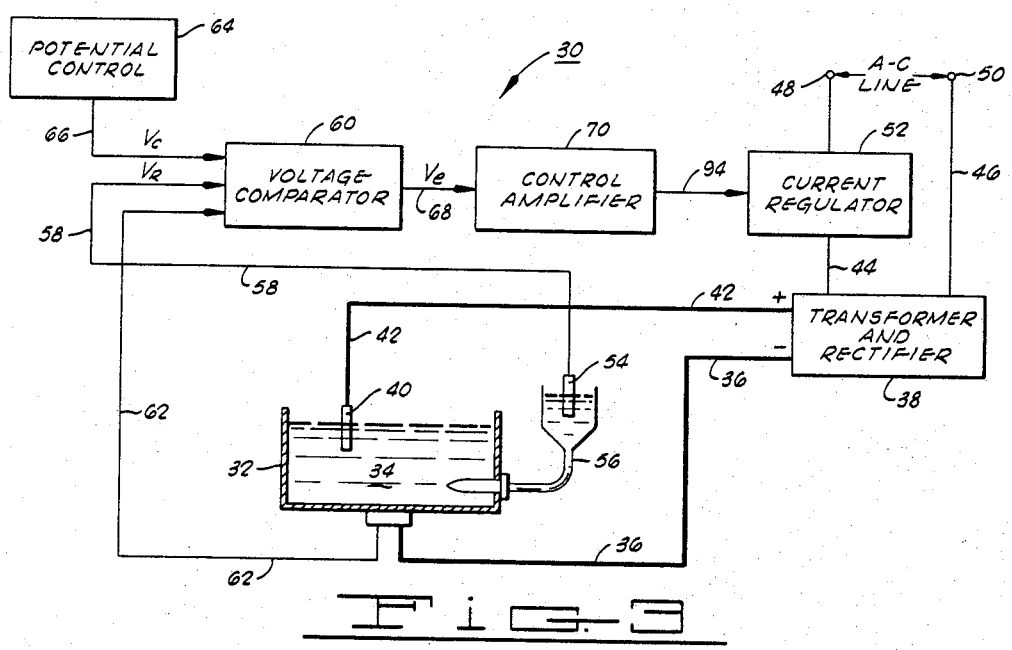
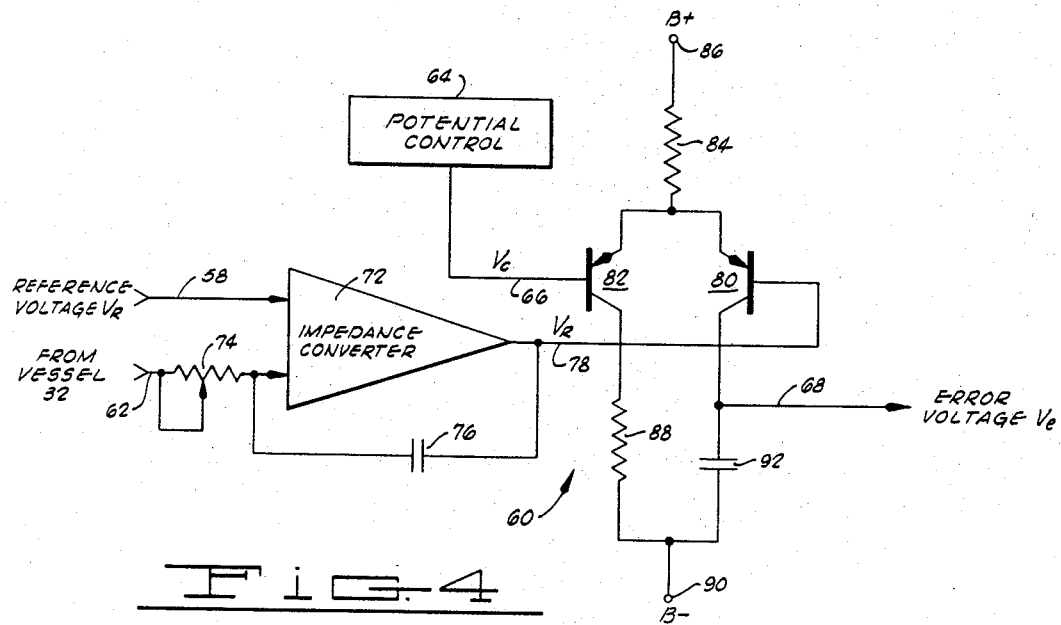

Dec. 3, 1968

J. D. SUDBURY ET AL 3,414,496

CONTROLLED POTENTIAL PROTECTION OF METALLIC
VESSEL-LATEX SOLUTION SYSTEMS

Filed Oct. 20, 1965

3 Sheets-Sheet 3

INVENTORS
WILLIAM P. BANKS &
JOHN D. SUDBURY
BY
William J. Miller
ATTORNEY

United States Patent Office 3,414,496
Patented Dec. 3, 1968

3,414,496
CONTROLLED POTENTIAL PROTECTION OF METALLIC VESSEL-LATEX SOLUTION SYSTEMS
John D. Sudbury and William P. Banks, Ponca City, Okla., assignors to Continental Oil Company, Ponca City, Okla., a corporation of Delaware
Filed Oct. 20, 1965, Ser. No. 498,496
6 Claims. (Cl. 204—147)

This invention relates to improvements in the art of protection of metal-solution systems, and more particularly, but not by way of limitation, it relates to a method and apparatus for preventing deposition plating of latex within metallic vessel-latex solution systems and also for the prevention of corrosion which may appear in some systems.

The term "latex" refers generally to liquid preparations of rubber compounds, both natural and synthetic, as well as to the colloidal suspension of many other polymers in an aqueous medium. To be more exact, a latex is an emulsion of rubber and various other ingredients in water which also may contain certain chemicals in solution; however, the term may also be associated with particular products made from rubber cements and other non-aqueous dispersions or solutions. Also, latices may be formed from certain man-made rubbers and from other synthetic materials such as plasticized vinyl resins.

The storage, transportation and processing of latex solutions is performed in various operations throughout diverse segments of industry. The problems attendant the handling of latex solutions is generally known throughout industry and the special care and maintenance required of the various metal-latex solution systems is an inherent and troublesome deficiency. The so-called fresh latex solutions, such as naturally occurring latex, can be highly corrosive in contact with metal ocntainers and pipe and valving gear such that costly equipment shut-down is necessitated for replacement and/or corrosion repair measures.

Another inherent difficulty, and a seemingly more important one, is the fact that there occurs a spontaneous plating of the latex on the interior surface of vessels containing latex solutions. This also presents a serious operating problem since there is a waste of latex from the latex solution itself, and the latex coating can clog the vessel and attached piping systems. It is the general practice that such vessels containing latex solutions must be frequently emptied and the plated-out latex coating must be physically removed—an expensive cleaning procedure and one which interferes markedly with the latex processing operations.

The present invention contemplates a method and apparatus for the prevention of latex deposition and corrosion on interior walls of metallic vessels containing latex solutions by means of controlled potential cathodic polarization. More particularly, the method entails the passing of direct current energy through the electrochemical cell formed by the metallic vessel and latex solution and in such a manner that the metallic vessel is a cathode of the cell. The direct current energy passage is controlled in a manner whereby potential control apparatus is regulated in response to the sensed potential of the metallic vessel to maintain the metallic vessel at or near a predetermined potential where minimal cathodic current activity exists as between the metallic vessel and the latex solution. It is further contemplated that various potential control and power application equipments may be employed for carrying out the method, depending upon the size of the operation, and, therefore, the required current delivery as may be assessed from predetermined polarization characteristics for the particular metallic vessel-latex solution system.

It is an object of the present invention to eliminate or greatly minimize the deposition plating of latex within metallic vessels containing latex solutions by means of controlled potential cathodic polarization.

It is also an object of the present invention to eliminate or greatly minimize any corrosion which may be existent in metallic vessel-latex solution systems as well as the deposition plating of latex within the metallic vessel by means of controlled potential direct current application.

Finally, it is an object of the present invention to provide method and apparatus for prevention of corrosion and latex deposition plating in metallic vessel-latex solution systems wherein the metallic vessel is constructed from either stainless or carbon steel.

Other objects and advantages of the invention will be evident from the following detailed description when read in conjunction with the accompanying drawings which illustrate the invention.

Figure 2:
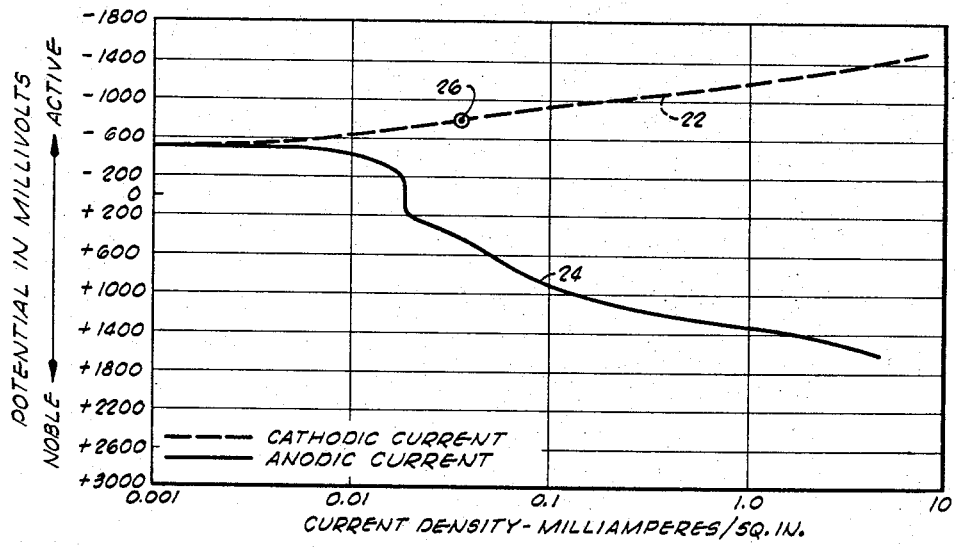
Figure 5:
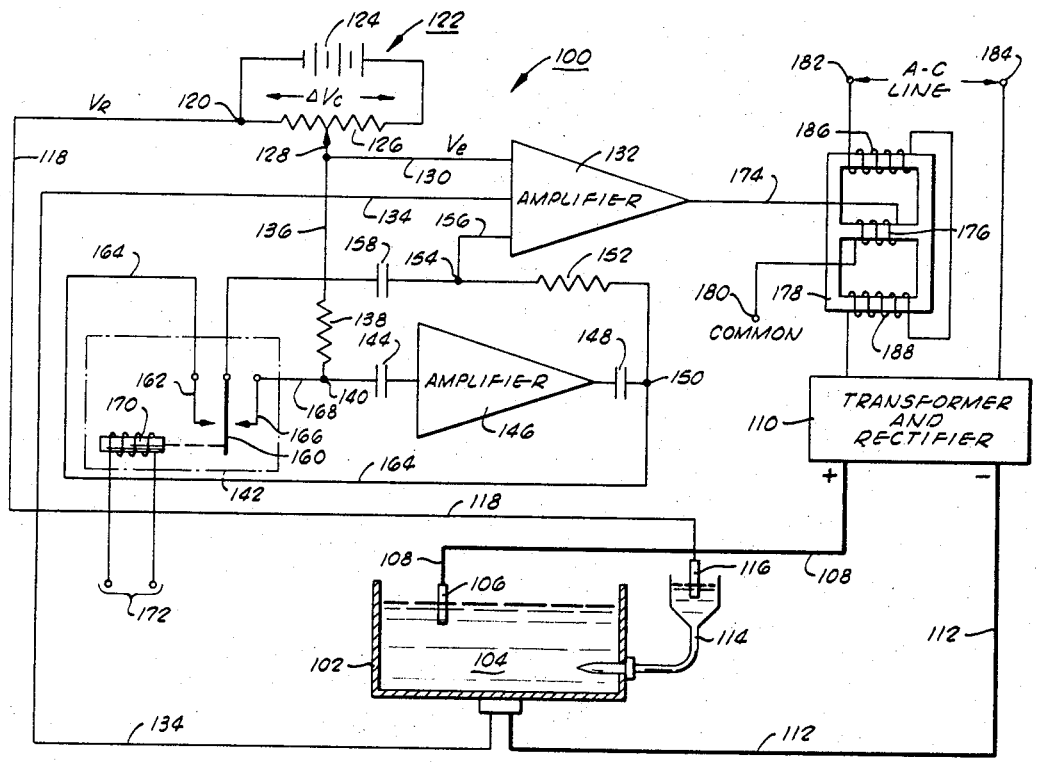
Figure 6:
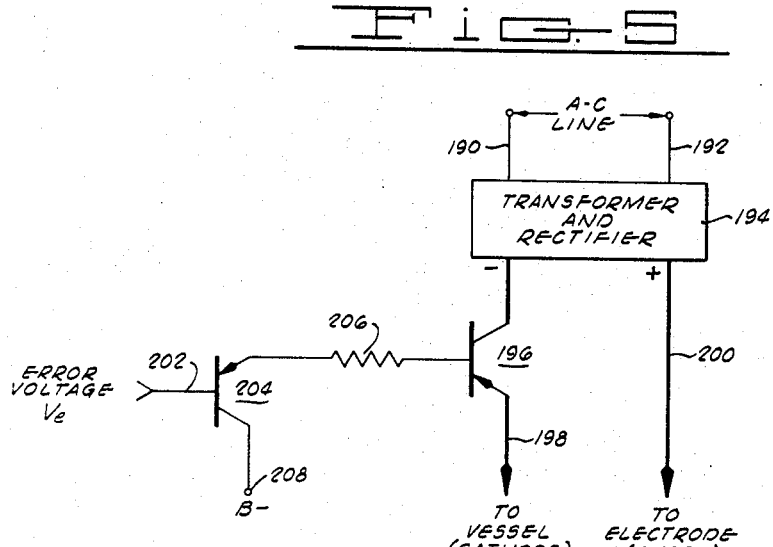

In the drawings:
FIG. 1 illustrates a polarization curve for 1020 mild steel in contact with a latex solution;
FIG. 2 illustrates a polarization curve compiled for 304 stainless steel in contact with a latex solution;
FIG. 3 is a block diagram of suitable controlled potential corrosion protection apparatus for carrying out the method of the invention;
FIG. 4 is a schematic and block diagram of specific circuitry for use in the apparatus of FIG. 3;
FIG. 5 is a partial schematic diagram of an alternative embodiment of apparatus for carrying out the method; and
FIG. 6 illustrates still further alternative circuitry for use in performing the method.

As is well known, especially in anodic corrosion protection practice, a polarization curve of the voltage versus current characteristics of a given metal-solution system may be established in order to discern therefrom the operating requirements of associated protection equipment. FIGS. 1 and 2 illustrate such polarization curves for steel in contact with a latex solution as will be described below. The polarization data can be gathered with the aid of well-known, commercially available laboratory equipment which is designed specifically for electro-chemical studies.

FIG. 1 is semi-logarithmic plot of voltage versus current for 1020 mild steel immersed in contact with type 1500 unstabilized latex at 80° F. The type 1500 latex is an exemplary latex solution as used herein and it is a styrene-butadiene product which is commercially available from the Texas U.S. Chemical Company of Port Neches, Tex. The potential measurements along the ordinate are taken with respect to a saturated calomel half-cell at 80° F. This potential indication as measured by the calomel half-cell is a relative measure for the mild steel potential and it extends from the positive to the more negative as the electrochemical condition of the mild steel progresses from noble to more active condition. This is in keeping with the standard convention as adopted by the Internal Union of Chemistry and Applied Physics. The logarithmic graduations along the abscissa are equal to milliamperes per square inch and they constitute a measure of the current density. It should be noted too that the dash-line denotes the presence of cathodic current flow while the solid curve denotes anodic current densities.

With reference to the polarization curve, it can be noted that at the more active potentials a cathodic current is flowing. As the vessel potential is reduced from about −1700 millivolts to about −850 millivolts, the cathodic current density curve 10 drops sharply to zero, or minimal current density, whereupon the current density becomes anodic at more noble potentials. The anodic current density rises sharply as shown by curve portion 12 until it reaches a point 14 which occurs at what is commonly termed the Flade Arrest potential. Upon passing through the Flade Arrest potential, the polarization curve drops into a dip 16 denoting decreased anodic current activity and then it rises to a plateau 18 which remains more or less at a relatively high level of anodic current density.

Since it is known that corrosion takes place in nearly direct proportion to current density and that deposition latex plating is formed in near proportion to the anodic current density, the polarization curve will give an indication of the optimum potential at which to keep the metal in order to avoid both latex plating and any corrosion which may take place. The data of Table I (see below) bears out the corrosion and latex plating versus current density relationship.

With reference to FIG. 1, it should be noted that the −1050 millivolts potential falls at the point 20 on the cathodic current portion 10 of the polarization curve. Thus, a consideration of the polarization curve and the tabular results taken together would indicate that a still more optimum control potential would exist at slightly more noble potentials which still remain within the cathodic region 10. That is, control potentials up to about −800 millivolts where the character of the current density changes from cathodic to anodic. The closer that this control potential can be maintained to the −800 millivolt potential, the less will be the total polarizing current expenditure while still preventing latex deposition and corrosion. Maintenance of this precise potential will depend upon the particular controlled potential protection apparatus, its sensitivity and stability, and several suitable types of equipment will be described below.

FIG. 2 shows still another metal-latex system which exhibits slightly different current characteristics. The ordinate graduations refer to the potential in millivolts

TABLE I.—1020 MILD STEEL/TYPE 1500 LATEX

| | Liquid phase corrosion rate, milli-inches per year | | Potential, millivolts | Current density, ma./sq. ft. | Properties of latex film on coupon |
|---|---|---|---|---|---|
| | Unprotected | Polarized | | | |
| A | 2.2 | | | | Thin, dirty, uniform. |
| B | | 21 | −250 (active) | 3.6 (anodic) | Heavy, dirty, non-uniform. |
| C | | 26 | +1,000 (noble) | 17 (anodic) | Heavy, dirty, uniform. |
| D | | 0.0 | −1,050 (active) | 45 (cathodic) | No film formed. |

As shown in Item A, no corrosion protection, that is current application, was associated with the 1020 mild steel and the Type 1500 latex and the unprotected mild steel was detected as having corroded at a rate of 2.2 milli-inches per year. Also, a thin, dirty and uniform plating of latex was deposited on the mild steel test coupon. The dirty latex film appearance is believed to be due to iron-containing precipitates. Items B, C and D then show the various results with protection apparatus employed and with the mild steel maintained at several different potential levels. Item B indicates that when the mild steel potential was maintained at −250 millivolts (active), the current density was anodic in character and that a heavy, dirty, non-uniform latex deposition resulted. Item C shows that at a still more noble potential, +1000 millivolts, the current density was anodic and increased in total charge while a heavy, dirty and uniform latex deposit was plated on the mild steel coupon. This is apparent from the graph (FIG. 1) by noting that the potential of −250 millivolts should give rise to a current density within the dip region 16 of the polarization curve while the much more noble potential of +1000 millivolts indicates current activity along the plateau 18 of the polarization curve.

Item D then indicates what would amount to an optimum potential for utilization in protection apparatus. In Item D the potential of −1050 millivolts (active) was employed, that is, the mild steel coupon was maintained at this potential, and the results were such that no latex film was formed on the coupon, no corrosion took place and that a cathodic current density existed. Thus, in an operative protection equipment, it would be desirable to employ the potential control apparatus to maintain the mild steel potential at the −1050 millivolt level while applying cathodic polarizing current to the mild steel-latex system to both inhibit corrosion and prevent the formation of plated-out latex deposit.

of 304 stainless steel immersed in contact with the type 1500 unstabilized latex. The potential measurements are taken at 80° F. with reference to a saturated calomel half-cell and the potential indications progress positive to negative or more noble to active in accordance with the International Convention. The current density indications along the abscissa are graduated in milliamperes per square inch of the metal surface. The polarization curve here shows the primary cathodic current portion 22 which decreases rapidly as the stainless steel potential becomes more noble to about −550 millivolts. Thereafter, the current density is anodic and increases rapidly, as shown by curve portion 24 as the stainless steel potential is made progressively more noble. In the curve of FIG. 2, there is no Flade Arrest potential, due to certain ionic exchanges between the stainless steel and latex solution; however, this is of no concern in the present method and apparatus since it depends upon the cathodic current portion 22 of the polarization curve for its proper operation. Thus, it should be apparent from the polarization curve that the maintaining of the stainless steel coupon at potentials of −550 millivolts or slightly more active would provide optimum protection against corrosion and would prevent the deposition of plated-out latex.

The experimental data compiled below in Table II bears out the indications which are suggested from study of the polarization curve of FIG. 2.

TABLE II.—STAINLESS STEEL/TYPE 1500 LATEX

| | Liquid phase corrosion rate, milli-inches per year | | Potential, millivolts | Current density, ma./sq.ft. | Properties of latex film on coupon |
|---|---|---|---|---|---|
| | Unprotected | Polarized, | | | |
| A | 1.9 | | | | Thin, clear, uniform. |
| B | | 0.12 | 0 | 0.51 (anodic) | Do. |
| C | | 11.5 | +1800 (noble) | 8.6 (anodic) | Heavy, dirty, uniform. |
| D | | 0.0 | −800 (active). | 22.0 (cathodic) | No film formed. |

The data of Item A show that the unprotected stainless steel corrodes at a rate of 1.9 milli-inches per year with the additional depositing of a thin, clear and uniform plating of latex deposit. Item B indicates results where the stainless steel was maintained at zero volts, a noble potential which allows moderately high anodic current activity. Thus, at zero volts potential, the stainless steel corrodes at a rate of .12 milli-inch per year and allows the plating-out of a thin, clear and uniform deposit. Item C shows greatly increased detrimental factors when the potential of the stainless steel is maintained at still more noble values. With the stainless steel maintained at +1800 millivolts (noble) very high anodic current activity exists and, therefore, the stainless steel corroded at a rate of 11.5 milli-inches per year while plating out a heavy, dirty and uniform latex deposit.

Item D then shows the desirable contrasting results. Here, the stainless steel potential was maintained at about −800 millivolts (active) which denotes an abscissa within the cathodic current portion 22 of the polarization curve. The stainless steel exhibited zero corrosion and no latex film was formed on the test coupon. Here again, it can be seen that the test potential of −800 millivolts (active) crosses the cathodic current portion 22 at point 26, a position of fairly high cathodic current density. It should be understood then that in order to keep the amount of power expenditure, which is necessary to provide corrosion protection, down to a much lower value, the control point potential may be moved more noble so long as it does not exceed the −550 millivolt point where the current density becomes anodic in character. This degree of potential control which can be utilized to provide optimum results will depend upon the particular controlled potential corrosion protection apparatus which is employed, as well as the size and substance of the vessel and latex solution.

APPARATUS

FIG. 3 shows the block diagram of a controlled potential protection apparatus 30 which is suitable for carrying out the method of the invention. The apparatus 30 is shown in functional or protective electrical connection to a metallic vessel 32 containing a latex solution 34. It should be understood that the metallic vessel 32, probably constructed of carbon steel or one of the stainless steel varieties, and the latex solution 34 contained therein would exhibit particular electrochemical characteristics which must be considered in the initial set-up of the protection apparatus 30. Thus, for each metal-solution system it is first necessary to compile a polarization curve for the particular materials and then it can be determined where to set the potential control in order to effect maximum protection. Such polarization curves are exemplified in FIGS. 1 and 2 for metal-latex solution systems in the general category.

The metallic vessel 32 is connected by means of a conductor 36 to the negative output terminal of a suitable transformer and rectifier 38. The transformer and rectifier 38 would be any of the conventional A-C to D-C converters which provide a low voltage-high current output. An auxiliary electrode 40 which may be formed from platinum or other of the inert metals is suitably fastened and insulated from the metallic vessel 32 such that it is immersed in contact with the latex solution 34. An anode lead 42 provides a connection between the auxiliary electrode 40 and the positive output terminal of the transformer and rectifier circuitry 38.

The transformer and rectifier 38 provides a D-C output between the anode lead 42 and cathode lead 36 in accordance with the amount of A-C voltage input applied on leads 44 and 46 from the A-C line input, terminals 48 and 50. A current regulator 52 (to be further described), interposed in one side of the A-C line input, controls the amount of alternating current applied to the transformer and rectifier 38 thereby varying its output in direct proportion.

A reference electrode 54, identified throughout as a saturated calomel half-cell but which may be other types such as silver-silver chloride, molybdenum-molybdenum oxide, etc., is maintained in electrochemical contact with the latex solution 34 by means of a suitable salt bridge 56. It should be understood that other equivalent ionic conduction junctures may be employed for maintaining electrochemical contact between the reference electrode 54 and the latex solution 34. The reference electrode 54 is then connected by a lead 58 to one input of a voltage comparator 60 and a vessel lead 62 provides a common connection from the metallic vessel 32 to the voltage comparator 60. A potential control 64, which may be any suitable direct current source for providing an adjustable standard potential, is also applied on a lead 66 to the voltage comparator 60.

The voltage comparator 60 may be any of several suitable types of circuit which can accept the reference potential $V_r$, as sensed by the reference electrode 54 and provided on lead 58, and which can accept the control potential $V_c$, as adjusted into the potential control 64 and provided on lead 66, thereafter to provide a difference voltage $V_e$ as shown being present on the output lead 68 to the input of a control amplifier 70.

One form of voltage comparator 60 is shown in FIG. 4. The reference voltage $V_r$, sensed by the reference electrode 54 and indicative of the potential of metallic vessel 32, is provided on lead 58 to an impedance converter 72. Also, the vessel or common connection is provided from the metallic vessel 32 on lead 62 to a potentiometer 74 and then to the impedance converter 72. The impedance converter 72 is a conventional circuitry, the provision of which is well within normal engineering skill. Impedance converter 72 may be described as a three-stage amplifier having a gain of unity. The response of the amplifier or impedance converter 72 is controlled by a feed back capacitor 76 in conjunction with the potentiometer 74. With such a feed back adjustment, the response of the protection apparatus 30 (FIG. 3) can easily be matched to the particular corrosion system under any operational conditions which might be encountered. Thus, the output of impedance converter 72 is provided on a lead 78 as a stabilized voltage indication of the potential of metallic vessel 32, the reference potential $V_r$.

The reference potential $V_r$ on lead 78 is applied to the base of a transistor 80 and, in the same manner, the pre-adjusted control point voltage $V_c$ on lead 66 from the potential control 64 is applied to the base of a transistor 82. The PNP type transistors 80 and 82 comprise a common emitter, balanced pair differential amplifier. The emitters of the PNP type transistors 80 and 82 are connected together and then through a resistor 84 to a terminal 86, a suitable source of positive supply voltage. The collector of transistor 82 is connected through a resistance 88 to a negative voltage supply terminal 90 while the collector of transistor 80 is connected through a capacitor 92 to the negative voltage supply 90. Thus, the balanced pair, transistors 80 and 82, have their conduction controlled in response to the respective inputs of the reference potential $V_r$ and the pre-adjusted control point potential $V_c$ such that a difference voltage can be taken off of the balanced pair as by lead 68 from the collector of transistor 80. This difference voltage is the control or error voltage $V_e$ as will be further described.

The error voltage $V_e$ is supplied on lead 68 to the input of control amplifier 70. The output of control amplifier 70 is then applied on lead 94 to control the current regulator 52. Control amplifier 70 may be one of the well known types of direct coupled amplifiers suitable for such control voltage handling. The amplifier 70 should have a high input impedance, probably in the neighborhood of 10 megohms, and it should be stable and free form drift due to temperature, supply voltage, etc. Further, it should exhibit reasonably good sensitivity in order that maximum precision and control efficiency is imparted to the protection apparatus 30.

The amplified control voltage present on lead 94 is then applied to the current regulator 52 which, in turn, regulates the power input to the transformer and rectifier 38 and therefore the output polarizing current on leads 36 and 42 to the metallic vessel-latex solution system. The current regulator 52 may be one of several well-known types of such device such as a saturable core reactor, silicon controlled rectifiers, or a motor driven autotransformer. Such current regulation devices are specifically disclosed in the U.S. Patent No. 3,127,337, entitled "Anodic Passivation System," issued to Conger et al. and assigned to the present assignee. Still other voltage responsive current regulation devices may be employed and a further solid-state type of current regulator is to be later described herein.

In the operation of the controlled potential protection apparatus 30 of FIG. 3, it is first necessary to establish a polarization curve for the particular substances involved. That is, and taking for example, the polarization characteristics for a 1020 mild steel metallic vessel 32 containing a type 1500 latex 34 would require a polarization curve of the substances in interaction in order that the protection apparatus 30 be properly set up and energized. Inspection of the polarization curve (FIG. 1) would indicate that a control point potential $V_c$ of about −850 millivolts would be proper to insure minimum corrosion of the metallic vessel 32 while prohibiting completely the plating-out of latex deposit on the interior surfaces of the metallic vessel 32 and any associated pipes and valves (not shown).

With the initial charging of latex solution 34 into the metallic vessel 32, the vessel potential will be quite active and at a high degree of cathodic current activity. Hence, the reference potential $V_r$ will provide a relative indication of the potential of metallic vessel 32 which is much more negative (more active) than the control point potential $V_c$ as pre-adjusted in potential control 64. Such more negative reference potential $V_r$ causes conduction in the voltage comparator 60 such that a large error voltage $V_e$ is present on lead 68 to control amplifier 70, lead 94 and current regulator 52. FIG. 4 shows one form of voltage comparator which would function to provide the proper output error voltage $V_e$ in proportion to the amount of potential difference between the control point voltage $V_c$ and the reference voltage $V_r$.

In FIG. 4, the potential of vessel 32, as detected by the reference electrode 54 is applied to the impedance converter 72 and thereafter on lead 78, as the reference voltage $V_r$, to the base of transistor 80. Similarly, the control point voltage $V_c$ from potential control 64 is applied on lead 66 of the base of transistor 82. Since the configuration of transistors 80 and 82 is a balanced pair of PNP transistors, the more negative base signal (that of reference voltage $V_r$) will cause the greatest conduction and therefore a difference voltage output (error voltage $V_e$) available as taken from the collector of transistor 80 on lead 68. The error voltage $V_e$ on lead 68 is then applied to the control amplifier 70 which, in turn, controls the current regulator 52 by the output voltage applied on lead 94.

The current regulator 52 being a voltage responsive device must act to allow current pasage from the A–C line, as applied at terminals 48 and 50, in proportion to the voltage of the control signal produced by control amplifier 70 and present on lead 94. Thus, as the amount of alternating current applied on leads 44 and 46 to the transformer and rectifier 38 is varied, so also is the rectified output from transformer and rectifier 38 as it is applied between the positive or anode lead 42 and the cathode lead 36 to the metal-latex solution system.

Thus, in the initial charging of the latex solution 34 into the metallic vessel 32 there is a wide divergence between the reference potential $V_r$ and the control point voltage $V_c$. However, as the initial heavy current application takes place, the metal-latex solution is rapidly polarized and the potential of metallic vessel 32 is made more noble, approaching the pre-adjusted control point voltage $V_c$. Since proportional current control is effected, as the vessel potential approaches the control point potential $V_c$, progressively less current is appiled through the metal-latex solution system until a point is reached where the protection apparatus 30 maintains the potential of metallic vessel 32 at (or very near) the pre-adjusted control point. This potential is then maintained continually with very little current application. Once this condition has been arrived at, the vessel system and the protection aparatus 30 can be left for long periods of time to remain in the protective condition wherein little or no corrosion takes place and no latex plating is deposited. It may be necessary to make periodic inspections if for no other reason than to check on the condition of the auxiliary electrode 40. Since this is the anode in the electrochemical system, it is contemplated that some latex deposition will be plated on the electrode 40. In the event that this should be excessive or bothersome, the electrode 40 can be made so that it is easily removable from vessel 32 for removal of any latex deposit.

An alternative form of protection apparatus and one which exhibits extremely precise control of high power applications is the controlled potential protection apparatus 100 of FIG. 5. The apparatus 100 is shown as employed for protecting a metallic vessel 102 containing a latex solution 104. A suitable auxiliary electrode 106 is maintained in immersed contact with the solution 104 while being connected by an anode lead 108 to a transformer and restifier circuit 110. A cathode lead 112 connects the negative output terminal of the transformer and rectifier 110 to the metallic vessel 102.

A conventional salt bridge 114 or other ionically conductive juncture, maintains a reference electrode 116 in electrochemical contact with the latex solution 104. The reference electrode 116 is then connected by a lead 118 to terminal 120, a reference potential $V_r$ input to a voltage comparator 122. The voltage comparator 122 is a bucking voltage type of comparator and consists of a D–C source 124 connected at one end to the terminal 120 and lead 118 and having a potentiometer 126 connected in parallel. The wiper arm 128 of potentiometer 126 can be adjusted to provide a predetermined control point voltage $V_c$ whereupon the bucking of an opposite polarity reference potential $V_r$ (on lead 118) will result in a difference voltage or error voltage $V_e$ on the output lead 130 to a differential amplifier 132. A common connection or lead 134 from the metallic vessel 102 is also provided to the differential amplifier 132.

A portion of the error voltage $V_e$ is also taken off by a lead 136 through a resistor 138 to the junction 140 where it is periodically chopped by a suitable mechanical converter 142 for application as an alternating current signal through the capacitor 144 to the A–C amplifier 146. The output of amplifier 146 is applied through a capacitor 148 to a junction 150 and then through a resistor 152 to a junction 154. From junction 154 the amplified A–C error signal is applied on a lead 156 to the other input of the differential amplifier 132. A capacitor 158 returns the output junction 154 to a chopper contact 160 while one stationary chopper contact 162 is connected by lead 164 back to the junction 150, in the output of the A–C amplifier 146, and the other, alternate stationary chopper contact 166 is connected by a lead 168 to the junction 140, on the input side of the A–C amplifier 146. The energizing coil 170 of the mechanical chopper 142 may be energized by applying an available alternating voltage of the desired frequency across terminals 172.

The advantage of the interactive amplification as between the D-C differential amplifier 132 and the A-C amplifier 146 allows the production of an output control signal on lead 174 from the differential amplifier 132 upon sustained variations in the error voltage $V_e$. Such circuitry minimizes the effects of drift, commonly present in D-C amplifiers. Thus, the A-C amplifier 146 is designed to have a gain which is substantially higher than that of the differential amplifier 132. For example, respective values of 80 and 150 have been employed in an operational system. In this manner the the portion of the error voltage $V_e$, as present on lead 136, chopped and conducted through capacitor 144 to the A-C amplifier 146, will provide an output which is greater in amplitude by a predetermined amount than that portion of error voltage $V_e$ applied directly on lead 130 to the differential amplifier 132. Further the capacitor 148 and resistance 152 in the output circuit of the A-C amplifier 146 are designed to have an extremely long time constant, on the order of about 200 seconds, so that very little change in voltage level will be effected by rapid variations in the error voltage $V_e$ as applied at the input.

In other words, the original error signal as present on the potentiometer wiper 128 must persist at a given amplitude for an appreciable period of time before there is a change in the modified error signal produced by the bypass circuit comprised of the chopper 142 and the A-C amplifier 146. Since this modified error signal is subjected to substantially more amplification than the original error signal (wiper 128 and lead 130), the modified error signal (the output of A-C amplifier 146) will exert the major control since the differential amplifier 132 provides a control signal output on lead 174 which is a difference signal between the original and modified error signals.

The control signal present on lead 174 is then applied through a control winding 176 of a saturable core reactor 178 to a common connection 180. The saturable core reactor 178 is connected in one side of the A-C line to control the amount of current flowing in the A-C circuit, the A-C energizing voltage being applied at terminals 182 and 184 for energization of the transformer and rectifier circuitry 110. Thus, the control winding 176 limits the amount of current flowing through the saturable core windings 186 and 188 in direct proportion to the amount of amplitude of the control voltage on lead 174 from the D-C amplifier 132.

In the operation of the controlled potential protection system 100, it will be assumed that the metallic vessel 102 is constructed of 304 stainless steel and the latex solution 104 is the type 1500 unstabilized latex. This will allow the polarization curve of FIG. 2 to be employed as the pre-adjustment reference. Inspection of the polarization curve reveals that a control point potential $V_c$ slightly more active than −550 millivolts would provide a proper set point or control point potential. Thus, the potentiometer wiper 128 would be adjusted to provide the potential of, for example, −600 millivolts on the wiper 128 and lead 130 with no reference voltage $V_r$ yet present on lead 118. The protection apparatus 100 is then ready for operation and the latex solution 104 can then be charged into the metallic vessel 102. It should be understood also that in some cases a protection apparatus may be applied to a storage or processing facility while the latex solution is already contained therein. Then it is merely necessary to disconnect the lead 118 or reference electrode 116 so that no other voltage indication is provided to the voltage comparator 122. Also, in some apparatus set-ups it may be desirable to provide a voltage meter to indicate the control point voltage value at the wiper element 128.

Prior to application of polarization current from the transformer and rectifier 110 through the anode lead 108 and cathode lead 112 to the metallic vessel-latex solution system, the vessel potential will be extremely negative or active, and the current density will be cathodic in character. This will result in a reference voltage $V_r$ which is much more negative than the pre-adjusted control point potential $V_c$ thereby producing a large difference potential or error voltage $V_e$ at the wiper element 128 (amplifier input leads 130 and 136). The large error voltage $V_e$ is applied to one input of the differential amplifier 132 on lead 130 and it is also applied on lead 136 through the resistor 138 where it is chopped by the chopper 142 to derive an equivalent alternating current voltage. This A-C voltage is then applied through capacitor 144 to the input of the A-C amplifier 146. The portion of the error voltage $V_e$ input from lead 136 is modified by amplification in the A-C amplifier 146 and it is applied through the low-pass filter of capacitor 148 and resistor 152 to the lead 156, the other input to the differential amplifier 132.

Since the amplification factor of the A-C amplifier 146 is higher by a predetermined amount than the amplification factor of the differential amplifier 132, a proportional difference voltage will be present at the output of the differential amplifier 132 on the lead 174. This control voltage on lead 174 is then conducted through the control winding 176 of the saturable core reactor 178 with return to the apparatus common at terminal 180. Thus, the alternating-current applied at terminals 182 and 184 is proportioned in accordance with the saturation of the saturable core reactor 178 as controlled by control winding 176. This proportioning of current input to the transformer and rectifier 110 similarly limits its power output for application between the metallic vessel 102 and anode electrode 106 through the latex solution 104.

Thus, as the protective function progresses, the cathodic current density within the latex solution 104 becomes progressively more polarized thus raising the potential of the metallic vessel 102 to a more noble potential value approaching the predetermined control point potential as set into the voltage comparator 122. As the vessel potential $V_r$ sensed by the reference electrode 116, approaches the preset control point voltage $V_c$ the amplification output of the differential amplifier 132 is proportionally diminished as is the energizing current on lead 174 through the control winding 176 of the saturable core reactor 178. After a short time the protection apparatus 100 will have driven the potential of metallic vessel 102 to a value at or very near to the control point voltage $V_c$ and it will maintain this condition for long periods of time without further attendance.

It is also contemplated that still other forms of potential control may prove desirable in certain applications. For example, the apparatus of FIG. 6 shows a potential control system wherein the A–C line is connected directly by leads 190 and 192 to a transformer and rectifier assembly 194. Thereafter, the potential control is exercised by controlling the conduction through a PNP type of transistor 196 connected directly in series with the cathode supply lead 198 to the metallic vessel. The positive supply lead or anode lead 200 would be connected in the usual manner to an electrode immersed in contact with a latex solution. The application of current to the vessel-latex solution system would be controlled by the error voltage $V_e$ as applied on a lead 202 to the base of a transistor 204. The emitter of transistor 204 then being connected through a resistor 206 to the base of transistor 196, and the collector of transistor 204 being tied directly to a suitable negative voltage supply 208. Thus, a negative going error voltage $V_e$ applied on lead 202 will cause increased conduction through the transistor 204 thereby reducing the potential at the base of transistor 196 to allow greater conduction of current therethrough. This type of control circuitry would also give proportional control of the applied current. That is, current applied through the metallic vessel-latex solution would be in direct proportion to the variations in the error voltage $V_e$.

It should be understood, that in some cases, it may be desirable, or at least sufficient, to provide an on-off type of current application. In general, this requires less extensive circuitry and in some applications the savings in equipment cost may justify the use of such intermittent current application systems. Equipments for such intermittent current control have not been specifically set forth herein, however, such corrosion protection apparatus is known and in general use in certain industrial practices, especially in some anodic passivation installations.

There are still other forms of proportional equipment which have not been specifically set forth or cited herein and which would be suitable for controlled potential corrosion protection in metallic vessel-latex systems. There exists a wide variety of specific circuit components such as voltage comparators, control amplifiers, current regulators, etc., which are suitable for use in most controlled potential corrosion protection equipment and the invention should not be limited to those specific equipments and circuits as set forth herein.

Changes may be made in the combination and arrangement of steps or elements as heretofore set forth in this specification and shown in the drawings; it being understood, that changes may be made in the embodiments disclosed without departing from the spirit and scope of the invention as defined in the following claims.

What is claimed is:

1. A method for protecting against corrosion and deposition plating within a metallic vessel containing a latex solution, comprising the steps of:
   sensing the potential of the metallic vessel;
   passing a direct current flow through said latex solution and said metallic vessel as a cathode; and
   controlling the direct current flow in response to a difference between said sensed potential of the metallic vessel and a predetermined control point voltage to maintain said vessel at a predetermined potential.

2. A method for protecting against corrosion and deposition plating of latex in a metallic vessel containing a latex solution wherein the vessel-solution system has a polarization curve exhibiting cathodic current density at the active vessel potentials, a Flade Arrest region, and anodic current density at all more noble vessel potentials, comprising the steps of:
   sensing the potential of the metallic vessel;
   applying direct current to the metallic vessel as a cathode and through the latex solution to an auxiliary electrode immersed in said latex solution;
   controlling the applied direct current in response to a difference between said sensed potential of the metallic vessel and a predetermined control point voltage such that the metallic vessel is maintained near a predetermined vessel potential more active than the Flade Arrest.

3. A method for protecting against corrosion and deposition plating of latex in a metallic vessel containing a latex solution, comprising the steps of:
   sensing the potential of the metallic vessel;
   applying direct current to the metallic vessel as a cathode and though the latex solution to an auxiliary electrode immersed in said latex solution;
   controlling the applied direct current in response to a difference between said sensed potential of the metallic vessel and a predetermined control point voltage such that the metallic vessel is maintained at a potential more active than potentials whereas anodic current activity is present.

4. A method as set forth in claim 3 wherein said metallic vessel comprises:
   a vessel constructed from carbon steel for containing said latex solution.

5. A method as set forth in claim 3 wherein said metallic vessel comprises:
   a vessel constructed from stainless steel to contain said latex solution.

6. A method of controlled potential protection against corrosion and deposition plating of latex in a metallic vessel-latex solution system comprising the steys of:
   sensing the potential of the metallic vessel; controlling the output from a direct current source in proportion to the degree with which said vessel potential is more active than a predetermined control point voltage; and
   applying said controlled direct current output to said metallic vessel as the cathode and to an auxiliary electrode immersed in said latex solution as an anode.

References Cited

UNITED STATES PATENTS

| | | | |
|---|---|---|---|
| 1,589,332 | 6/1928 | Sheppard et al. | 204—182 |
| 3,127,337 | 3/1964 | Conger et al. | 204—196 |

HOWARD S. WILLIAMS, *Primary Examiner.*

T. TUNG, *Assistant Examiner.*